United States Patent
Noth et al.

(10) Patent No.: US 10,375,973 B2
(45) Date of Patent: Aug. 13, 2019

(54) MACHINE AND SYSTEM FOR PREPARING A COOLED FOOD PRODUCT WITH AERATED OR WHIPPED TEXTURE IN CONTROLLED MANNER

(71) Applicant: NESTEC S.A., Vevey (CH)

(72) Inventors: Andre Noth, Pully (CH); Alfred Yoakim, St-Legier-la Chiesaz (CH); Charles-Austin Sunderland, Laversines (FR)

(73) Assignee: Societe des Produits Nestle S.A., Vevey (CH)

( * ) Notice: Subject to any disclaimer, the term of this patent is extended or adjusted under 35 U.S.C. 154(b) by 380 days.

(21) Appl. No.: 15/033,718

(22) PCT Filed: Oct. 28, 2014

(86) PCT No.: PCT/EP2014/073133
§ 371 (c)(1),
(2) Date: May 2, 2016

(87) PCT Pub. No.: WO2015/063094
PCT Pub. Date: May 7, 2015

(65) Prior Publication Data
US 2016/0278401 A1    Sep. 29, 2016

(30) Foreign Application Priority Data
Oct. 30, 2013 (EP) ..................................... 13190868

(51) Int. Cl.
*A23G 9/20* (2006.01)
*A23G 9/08* (2006.01)
(Continued)

(52) U.S. Cl.
CPC ............... *A23G 9/228* (2013.01); *A23G 9/08* (2013.01); *A23G 9/12* (2013.01); *A23G 9/20* (2013.01); *A23G 9/28* (2013.01)

(58) Field of Classification Search
CPC . A23G 9/12; A23G 9/228; A23G 9/20; A23G 9/08; A23G 9/28
See application file for complete search history.

(56) References Cited

U.S. PATENT DOCUMENTS 4,535,604 A * 8/1985 Cavalli ................. A23G 9/08
62/342
4,538,427 A * 9/1985 Cavalli ................. F25D 11/00
62/342
(Continued)

FOREIGN PATENT DOCUMENTS

CN    201174951    1/2009
EP    0162023    11/1985
(Continued)

OTHER PUBLICATIONS

Patent Abstract of Korea—Publication No. 100751915—Published Aug. 17, 2007—1 page.
(Continued)

*Primary Examiner* — Marc E Norman
*Assistant Examiner* — Nelson J Nieves
(74) *Attorney, Agent, or Firm* — K&L Gates LLP

(57) ABSTRACT

The invention relates to a machine for preparing a cooled food product, comprising: —a receiving seat (1), for accommodating an essentially cup-shaped container, comprising a heat exchange element (1a) having a heat exchange contact surface (21) arranged to be in contact with an outer surface of a side wall (8d) of the container when the container is placed in the machine, —a cooling unit (4) arranged for cooling the heat exchange element (1a) and, —a stirring unit (5) connectable to a stirring member (9) and arranged for
(Continued)

driving the stirring member (9) in at least one rotational movement; wherein it comprises —means for measuring the temperature of the product while being prepared, —a control unit for automatically setting output parameters according to input parameters received by the control unit and compared to threshold values stored in the unit; —wherein the output parameters comprises: at least one rotational velocity of the stirring member and the cooling power of the cooling unit, and —wherein the input parameters comprises any one or more of: the measured product temperature, the stirring time.

11 Claims, 9 Drawing Sheets

(51) Int. Cl.
    *A23G 9/28* (2006.01)
    *A23G 9/22* (2006.01)
    *A23G 9/12* (2006.01)

(56) References Cited

U.S. PATENT DOCUMENTS

| | | | |
|---|---|---|---|
| 4,712,920 A | 12/1987 | Ames et al. | |
| 4,838,702 A * | 6/1989 | Torimitsu | A23G 9/228 366/144 |
| 4,853,518 A * | 8/1989 | Bravo | A23G 9/30 219/441 |
| 5,199,278 A * | 4/1993 | Cocchi | A23G 9/086 366/149 |
| 5,363,746 A | 11/1994 | Gordon | |
| 5,549,042 A * | 8/1996 | Bukoschek | A23G 9/12 366/144 |
| 6,041,614 A * | 3/2000 | Yamaya | A23G 9/12 165/61 |
| 6,264,066 B1 * | 7/2001 | Vincent | A23G 9/228 222/105 |
| 7,878,021 B2 | 2/2011 | Perrier et al. | |
| 2001/0038019 A1 | 11/2001 | Vincent et al. | |
| 2002/0189460 A1 * | 12/2002 | Brown | A23G 9/04 99/275 |
| 2003/0134025 A1 * | 7/2003 | Vaghela | A23G 9/32 426/565 |
| 2004/0060307 A1 * | 4/2004 | Cunha | A23G 9/045 62/135 |
| 2004/0141411 A1 * | 7/2004 | Huang | A23G 9/12 366/204 |
| 2006/0110515 A1 * | 5/2006 | Waletzko | A23G 9/06 426/565 |
| 2009/0254220 A1 * | 10/2009 | Shin | F25D 11/02 700/275 |
| 2009/0280214 A1 * | 11/2009 | Kim | A23C 9/1223 426/34 |
| 2010/0125178 A1 * | 5/2010 | Hyde | G06F 19/3475 600/300 |
| 2011/0228632 A1 * | 9/2011 | Kozlowski | A23G 9/12 366/343 |
| 2012/0057426 A1 * | 3/2012 | Bravo | A21C 1/06 366/144 |
| 2012/0102993 A1 * | 5/2012 | Hortin | F25D 23/126 62/189 |
| 2012/0250453 A1 * | 10/2012 | Kozlowski | A23G 9/224 366/343 |
| 2012/0312049 A1 * | 12/2012 | Downs, III | A23G 9/20 62/340 |
| 2013/0098098 A1 * | 4/2013 | Ugolini | A23G 9/04 62/342 |
| 2013/0340456 A1 * | 12/2013 | Hoare | B01F 7/00033 62/126 |
| 2015/0122294 A1 * | 5/2015 | Wang | A61B 1/015 134/22.12 |
| 2016/0366906 A1 * | 12/2016 | Geng | B01F 7/00075 |
| 2017/0042179 A1 * | 2/2017 | Thomas | A23G 9/12 |
| 2017/0197191 A1 * | 7/2017 | Goodson | B01F 15/00389 |
| 2017/0280745 A1 * | 10/2017 | Herbert | A23G 9/28 |
| 2017/0360060 A1 * | 12/2017 | De'Longhi | A23G 9/12 |

FOREIGN PATENT DOCUMENTS

| | | |
|---|---|---|
| EP | 2266417 | 12/2010 |
| EP | 2266418 | 12/2010 |
| EP | 2567623 | 3/2013 |
| JP | S59220157 A | 12/1984 |
| JP | 02245142 A2 | 9/1990 |
| JP | 09098723 A2 | 4/1997 |
| JP | 2000000064 A | 1/2000 |
| JP | 2012068238 | 4/2012 |
| JP | 2013530708 A | 8/2013 |
| SU | 1493228 A1 | 7/1989 |
| SU | 1651818 A1 | 5/1991 |
| WO | 9921466 | 5/1999 |
| WO | 2012122594 | 9/2012 |

OTHER PUBLICATIONS

Japanese Office Action corresponding to Application No. 2016-526314, dated Oct. 2, 2018, 10 pages.

* cited by examiner

MACHINE AND SYSTEM FOR PREPARING A COOLED FOOD PRODUCT WITH AERATED OR WHIPPED TEXTURE IN CONTROLLED MANNER

CROSS REFERENCE TO RELATED APPLICATIONS

The present application is a National Stage of International Application No. PCT/EP2014/073133, filed on Oct. 28, 2014, which claims priority to European Patent Application No. 13190868.3, filed Oct. 30, 2013, the entire contents of which are being incorporated herein by reference.

FIELD OF THE INVENTION

The present invention is directed to a machine and system for processing a food product in order to prepare an aerated or whipped cooled food product, on demand and in a controlled manner, such as frozen ice cream or whipped chilled dairy, the system comprising a product preparation machine and a dedicated packaging container.

BACKGROUND OF THE INVENTION

In the domain of food and drink processing machines, devices are known by means of which a frozen confectionery product such as an ice cream product may be prepared by mixing the ingredients in a dedicated vessel, and cooling the mixture for a predefined amount of time. This preparation procedure has however several drawbacks. In particular, all the ingredients must be mixed previously, the volume of such machines corresponds usually to five or more serving portions of the same flavor and the time necessary is about a half an hour. Moreover, the ingredients necessary for the preparation come in contact with a large number of parts of the preparation machine (e.g. a stirrer, tanks, or a dispenser), which all have to be cleaned.

There is a demand for increasing the convenience of the preparation of cool confectionery or desserts, in particular, reducing the preparation time, avoiding the hassle of cleaning the surfaces in contact with food and providing on demand an appealing texture and diversity of products.

There is also a demand for offering to consumers a range of different freshly made cooled products, in an automated and well controlled manner.

Machines such as sorbet makers have been developed with stirrer having essentially for function to aerate the product while cooling it and so to ensure a smooth texture and an increase of the product volume. For frozen confectionery, the crystallization of liquid happens progressively while the large crystals are broken down constantly by the stirrer. Generally, the machine and its stirrer must be cleaned and it generally half an hour to make the frozen product.

WO 2010/149509 relates to a system for preparing freshly made single portion of frozen confectionary product, the system comprising a cylindrical container designed for being inserted into a dedicated preparation device having a heat exchange portion, said container comprising at least one scraper constituting stirring means movable within the container and ingredients for producing a frozen confectionary when being cooled and moved. The stirring means of the container are arranged to provide a rotational and axially oscillating movement within the container. Thereby, the scraper is arranged coaxial with the container body.

U.S. Pat. No. 7,878,021 relates to an ice-cream maker comprising a blade member constituting stirring means arranged in a double-walled container, and a housing containing a driving mechanism that can generate a blade-rotating movement in relation to the double-walled container. The inner wall forms a tub, and the blade having the form of a spoon is used to scrape the inner wall. The movement of the blade member is obtained by maintaining the blade member static and offset with a scraping surface thereof parallel to the inner surface of the container and by driving the container in rotation around its central axis.

US20060263490 relates to a frozen confectionery maker comprising a cup, a cup holder having a rotating coupling for rotatably engaging the cup and a removable stirrer fixedly positioned with the housing above the cup holder for stirring the confectionery mixture in the cup as the cup is rotated by the rotatable coupling.

It is known from the state of the art, as per document U.S. Pat. No. 5,363,746 A a kitchen appliance which enables automatic preparation of desserts according to instructions pre-programmed into the appliance. Document EP 2266418 A1 describes a device for preparing frozen confection in a container comprising the ingredients for the preparation of the frozen product, which will be moved and cooled in the device. Document WO 2012/122594 A1 of the state of the art describes an ice-cream maker comprising a rotatable paddle, the operation of which is controlled by a processor module. Also known are for example document WO 99/21466 A1, which describes a blending apparatus comprising an integral blender which processes the product inside, and EP 0162023 A2 describing a household appliance comprising means for sensing the ice-cream consistency.

Therefore, the present invention generally aims at proposing a machine able to produce a variety of freshly made cooled, aerated or whipped food products, conveniently and in an automated and controlled manner, while reducing the preparation time.

OBJECT AND SUMMARY OF THE INVENTION

The present invention seeks to address the above-described problems. The invention also aims at other objects and particularly the solution of other problems as will appear in the rest of the present description.

In a first aspect, the invention proposes a machine for preparing a cooled food product, comprising:
 a receiving seat, for accommodating a container, comprising a heat exchange element having a heat exchange contact surface arranged to be in contact with an outer surface of a side wall of the container when the container is placed in the machine,
 a cooling unit arranged for cooling the heat exchange element and,
 a stirring unit connectable to a stirring member and arranged for driving the stirring member in at least one rotational movement;
 wherein it comprises:
 means for measuring the temperature of the product while being prepared,
 a control unit for automatically setting output parameters according to input parameters received by the control unit and compared to threshold values stored in the unit;
 wherein the output parameters comprises: at least one rotational velocity of the stirring member and the cooling power of the heat exchange element, and wherein the input parameters comprises any one or more of: the measured product temperature and the stirring time.

Accordingly, the machine, as thus defined, is capable of providing a wide range of freshly made cooled products such as frozen or chilled food product with the right texture and the proper degree of aeration.

Preferably, the machine further comprises torque sensing means connected to the stirring means for measuring the change of viscosity of the product during preparation and wherein the input parameters further comprise the sensed torque value. It is thereby possible to obtain the desired viscosity of product and to be also able to control the preparation according to the change of viscosity of the product. As a result, the preparation time can be significantly decreased and the final desired texture can be obtained successfully.

In a possible mode, the machine further comprises a product volume sensor, e.g., an ultrasonic sensor, to sense the volume increase (i.e., overrun) of the product in the container while being aerated. The product volume (or overrun) sensor enables to control preparation parameters such as the stirring time and/or the rotational velocities of the stirring means.

Preferably, it further comprises an air transmission means for providing air into the product, and the input parameters further comprise the sensed product volume and/or the output parameters further comprise an actuation time for the air transmission means.

By controlled addition of forced air within the product while stirring, it is thereby made possible to increase the overrun during the preparation and/or significantly decrease the preparation time. In particular, product with a higher amount of entrapped air can be obtained compared to the use of mechanical stirring alone. This also enables to enlarge the range of products capable to be prepared by the machine.

In one aspect, the control unit is further arranged to control the preparation of the cooled product by storing output parameters and/or set threshold values of input parameters which are specific to the type of cooled product to be prepared. The parameters such as the rotational velocities of the stirring means can so be adjusted precisely as a function of the type of product to be prepared, in particular, to obtain the desired aeration and crystalline or creamy texture. For instance, output parameters and/or set threshold values of input parameters can be determined specifically for products such as: whipped yoghurt, milk smoothie, ice cream, sorbet, sherbet, water ice, frozen yogurt, frozen dairy, soft ice, granitas, Mellorine, frozen custard, non-dairy frozen confection, milk ice, ice lolly, gelato or frozen jelly, or chilled desserts such as mousses, coffee latté, or milk shakes.

Furthermore, the control unit can be further arranged to control the preparation of the cooled product by storing output parameters and/or set threshold values of input parameters according to different phases during the preparation of the cooled product wherein the output parameters are set at different values.

Indeed, types of cooled products have specific preparation requirements for reaching the desired quality which can be better fulfilled by a phase-by-phase regulation.

As a first example, for certain products such as fruit smoothie, it is better to start stirring the product at a high velocity while the product is still ambient and not too cold. If stirring is produced essentially when the product is already significantly cooled down, undesired crystals are formed which inhibit the overrun of the product. Therefore, it would be preferred for such product to apply different stirring phases depending on the product temperature. As a second example, for certain low viscosity products at ambient, such as ice cream, it is important to stir the product at low velocity to prevent splashing and then increase the rotational velocity/velocities once the product reached a certain viscosity. Again, phase-dependent regulation is preferred for preparing these cooled products.

In a preferred mode, the machine comprises a recognition means connected to the control unit for interacting with identification means of the container. The control unit is further configured to control the preparation of the cooled product according to the type of cooled product identified by the recognition means. The main advantage is that the preparation can be perfectly adapted to the identified product without risk of error. Additionally, the range of products potentially capable of being prepared can be expanded easily. The user interface of the machine can also be simplified accordingly.

According to an aspect of the invention, the stirring unit is preferably arranged for driving the stirring member according to a combination of movements, wherein the combination of movements comprises a first rotational movement of the stirring member about its longitudinal axis (Z) which is arranged offset to a central longitudinal axis (X) of the receiving seat and/or of the container and wherein the second rotational movement comprises an orbital rotational movement about the central longitudinal axis (X) of the container or seat and wherein the output parameters comprise the first velocity of the first rotational movement and the second velocity of the second rotational movement of the stirring member.

Such combination of movement provides a circulation of the liquid or liquid-foam mixture or partially crystallized liquid or liquid-foam mixture product in the container from the periphery towards the interior as well as and from the interior towards the periphery of the container. By "interior" it is referred here to a referential which is directed to the centre of the container or close to it, as opposed to the "periphery" which refers to a referential which is at or close to the side wall of the container. There is so substantially no liquid product in the container left unstirred during the preparation. As a result, an enhanced heat exchange by forced convection between the heat exchange element and the product is provided in the container. In particular, the formation of a hard crystallized crust or skin, e.g. of frozen product, at an inner surface of the container is prevented. Hence, the insulation and a reduction of the effectiveness of the heat transfer to and from the product in the interior of the container is prevented. The aeration of the product is also improved thereby compensating the reduced possible foamability of certain shelf-stable starting products such as those thermally treated.

The machine according to the invention preferably comprises a stirring member which is designed for being selectively or removably connectable to the stirring unit of the machine. The stirring member may be provided as part of the machine or alternatively may be provided within the container itself. Thereby, the stirring member is preferably shaped to interact with an inner surface of the container such as an inner freezing surface. The stirring member may be designed to be used as process stirring means, i.e. stirring member for the preparation of the product, as well as a spoon for consumption of the resulting confectionery product.

The stirring member when connected to the stirring unit of the machine is preferably arranged with respect to the container and/or the receiving seat of the machine such that its longitudinal axis is offset to the central longitudinal axis of the receiving seat and/or to the centre longitudinal axis of the container. The stirring member can be parallel or slightly inclined relative to the central longitudinal axis of the receiving seat and/or to the centre longitudinal axis of the container.

The stirring member is preferably arranged such that its longitudinal axis is at a constant horizontal distance offset from the centre axis of the receiving seat comprising the heat exchange element and/or the centre axis of the container. The stirring unit may as well be designed to vary the horizontal distance between a longitudinal axis of the stirring member and the central longitudinal axis of the receiving seat and/or the central longitudinal axis of the container.

The orbital rotational movement (referred hereafter as the "second rotational movement") of the stirring member about the central longitudinal axis of the container may be directed in the same or in an opposite direction with respect to a first rotational movement of the stirring member about its own axis.

In other words, the stirring member is arranged to rotate epicyclically relative to the central axis of the container (or receiving seat) while the stirring member or container is arranged to rotate in an orbital configuration about the centre of the container.

The velocities of the first and second rotational movements of the stirring member are set depending on the type of cooled confectionery to produce (e.g., whether it is a frozen dessert or whipped chilled dairy product) and preferably differ from one another. These variations are necessary to take into account the different viscosities of the starting confectionery product. For example, a slower velocities may be required for low viscosity liquid to prevent splashes. Also, the overrun of the final cooled confectionery must meet a level which differs depending on the type of confectionery desired.

For example, the angular velocity $\omega 2$ of the second rotational movement can be lower than the angular velocity $\omega 1$ of the first rotational movement of the stirrer. This can be the case for ice cream product for example. For example, the angular velocity $\omega 2$ can be preferably less than 35%, more preferably less than 25%, even more preferably less than 15% of the angular velocity $\omega 1$.

In a preferred example, the angular velocity $\omega 1$ is preferably between 100 and 2000 rpm, more preferably between 300 and 1600 rpm. Also, the angular velocity $\omega 2$ is preferably between 10 and 300 rpm, more preferably between 20 and 90 rpm.

In other possible modes, angular velocity $\omega 2$ of the second rotational movement is equal to or higher than the angular velocity $\omega 1$ of the first rotational movement of the stirrer.

The plurality of movements of the stirring member may further comprise a translatory motion of the stirring member. The translatory motion of the stirring member is preferably in a direction lying in a different plane than a first or second rotational movement of the stirring member.

The translatory motion of the stirring member is preferably a linear movement in a direction parallel to an inner surface (preferably, the sidewall surface) such as an inner freezing surface of the container. Thereby, the translatory motion is preferably along an axis of direction which is arranged at an angle with respect to the rotational axis of the container and/or a centre axis of the seat.

The direction path of the translatory motion of the stirring member and the respective rotational axis of the container or the seat preferably enclose an acute angle between 5 and 60°, more preferably between 10 and 50°, even more preferably between 15 and 45°.

The stirring unit may as well be designed for providing a linear motion of the stirring member in a direction which is essentially parallel to a rotational axis of the container.

In a preferred embodiment, the stirring unit of the machine is designed for rotating the stirring member connectable to the stirring unit about at least two rotational axes within the container which are different from each other. In addition, the stirring unit is designed for moving the stirring member in a direction parallel to an inner surface of the container such as an inner freezing surface of the container.

The control unit of the machine may further be designed to provide a continuous and/or non-continuous motion of the stirring member about the respective axes respectively in the desired directions.

The control unit of the machine is designed to control and adapt the operation of the heat exchange element of the machine. In particular, an on/off state as well as the cooling power may be controlled.

The "cooling power" is generally obtained by adjusting the speed of the compressor and by varying the opening of the expansion valve positioned between the compressor and the heat exchange element (i.e., evaporator) in the cooling circuit.

The machine may further comprise torque sensing means connected to the stirring unit and/or the control unit. The torque sensing means may sense the torque which is proportional to the electrical current. Accordingly, the control unit is preferably designed for controlling at least the rotational velocities of the stirring member in response to the information provided by the torque sensing means. The viscosity of the product sensed by the torque sensing means may trigger the end of the recipe, the product having reached the targeted viscosity. For this, in response to a threshold of viscosity, the control unit stops the rotational movements of the stirrer and optionally, also stops or reduces the electrical power to the cooling unit.

Hence, dependent on the viscosity of the product sensed by the torque sensing means, the control unit may adapt the direction and/or velocity of the plurality of movements of the stirring member connected to the stirring unit.

The machine is equipped with temperature sensing means for providing information regarding the temperature of the food product within the container. The temperature sensing means are connected to the control unit of the machine so that the control unit may adapt the direction and/or velocity of the plurality of movements of the stirring member connected to the stirring unit in response to the temperature of the food product within the container. The temperature reached by the product sensed by the temperature sensing means may also trigger the end of the recipe, the product having reached the targeted temperature. For this, in response to a threshold of temperature, the control unit stops the rotational movements of the stirrer and optionally, also stops or reduces the electrical power to the cooling unit.

The control for ending the recipe may also be a combination of the sensed viscosity and product temperature.

The heat exchange element of the machine is preferably integrally formed with the receiving seat for accommodating the container in the machine. The heat exchange element is preferably an evaporator connected to a cooling circuit of the machine. Thereby, the heat exchange element is preferably an essentially annular element forming a part of the receiving seat and designed to contact with an outer circumferential wall of the dedicated container.

The machine may further comprise a defrost system for facilitating the removal of the container from the machine.

In a further aspect, the invention relates to a system comprising a machine as described above and further comprising a container for holding a predefined amount of ingredients.

The container is preferably a single-use container which provides an initial packaging container for a predefined amount of ingredients. The packaging container preferably contains confectionery ingredients which are stored under ambient conditions and shelf stable for an extensive period of time (e.g., several weeks). The confectionery ingredients are preferably under liquid form. Further, the container is also designed for being used as process container, i.e. as container in which the frozen confectionary is prepared, as well as serving container, i.e. as container from which the consumer may directly consume the resulting frozen confectionary. Preferably, the packaging container comprises an identification means containing a recipe code related to the type of cooled product to be prepared. In the preferred mode, the identification means comprises at least one barcode.

The term "single-use container" when used in the present invention encompasses any container suitable for being disposed after being used for the preparation of the single-portion of cooled product. Thereby, the containers are preferably at least partially recyclable.

The term "cooled food product" within this application is intended to refer to different types of cooled, chilled or at least partially frozen confectionery product. Non limiting examples are whipped yoghurt, milk smoothie, ice cream, sorbet, sherbet, water ice, frozen yogurt, frozen dairy, soft ice, granitas, Mellorine, frozen custard, non-dairy frozen confection, milk ice, ice lolly, gelato or frozen jelly, or chilled desserts such as mousses, coffee latté, or milk shakes.

The container comprises a body which is preferably a single-wall member comprising a cavity for the ingredients. The body of the container is preferably at least partially made of metal such as aluminium or steel and/or plastic material. The body may as well be at least partially made from biodegradable material such cardboard or starch-PLA.

It is preferable that the thickness of the body is small enough to ensure an effective heat transfer and, consequently, a cooling of the product in a short time, preferably, in less than 5 minutes. In particular, the thickness of the body is between 0.03 and 5 mm, preferably, between 0.05 and 2 mm.

In a preferred embodiment, the body of the container has an inverted conical or curved shape. The container is preferably rotational symmetric about a central longitudinal axis of the container.

The container may comprise a heat exchange portion which is preferably integrally formed with the body of the container. The heat exchange portion is preferably made from a material with enhanced thermal conductivity such as metal, e.g. aluminium or steel. The heat exchange portion is preferably arranged such as to overlap with the heat exchange contact surface of the machine when the container is accommodated in the seat thereof. The heat exchange portion is preferably an annular portion of predefined height $h1$.

The container preferably comprises an inner freezing surface that is preferably shaped to interact with the stirring member of the system. The inner freezing surface is preferably linear in sectional side view. The inner freezing surface is preferably an annular inner surface of the container body with preferably constant height.

The inner freezing surface may be constituted by an inner surface of the heat exchange portion of the container.

Accordingly, effective freezing of the inner surface by means of a dedicated machine is enabled.

In a preferred embodiment, the stirring member, when connected to the machine, is arranged adjacent to the inner freezing surface of the container such as to define scraping area between the inner freezing surface and an outer annular scraping surface of the stirring member.

Preferably, a vertical extension $h2$ of the scraping area within the container is equal to or larger than a vertical extension $h3$ of the heat exchange contact surface of the machine.

Depending on the resulting food product to be prepared within the specific container, the container may comprise a dedicated volume such as for example 150 ml for light aerated desserts, 200 ml for an ice-cream product or 300 ml for a milkshake.

The product can be overrun in the machine to a ratio comprised between 5% and 300% of its initial volume. Therefore, the container should be sized with a sufficient free volume (i.e., not occupied by the initial product) to anticipate the increase of volume of the aerated product at the end of the preparation process. For certain recipes, the product is not overrun.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1:
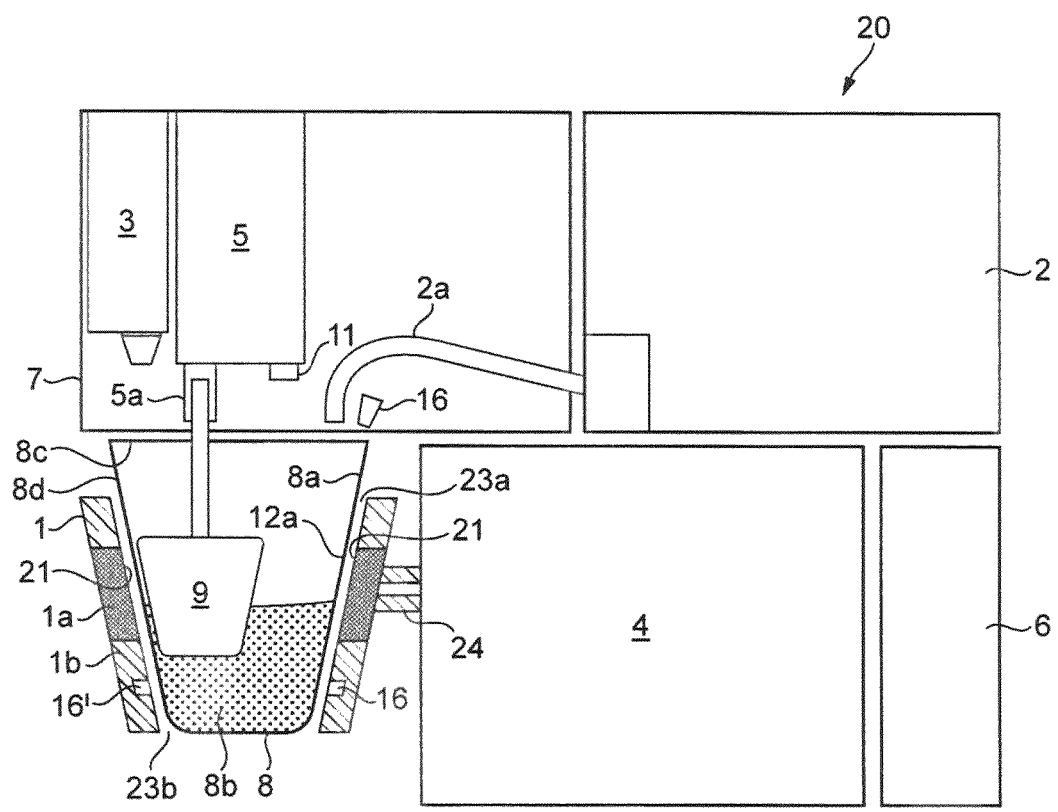
FIG. 1 shows a schematic drawing of the system for preparing a cooled food product according to the invention.

FIG. 1 relates to a preferred embodiment of a system according to the present invention comprising a single-use container 8 and a preparation machine 20 designed for preparing a cooled food product such as a frozen or chilled confectionary by means of the container 8.

The machine 20 preferably comprises a receiving seat 1 for receiving the container 8 therein. The receiving means 1 are preferably shaped in V-form or truncated conical form when seen in sectional side view as indicated in FIG. 1. Thereby, the receiving seat 1 preferably comprises an insertion opening 23a in which the container 8 may be placed, as well as a lower opening 23b enabling the accommodation of containers of various sizes.

Further, the receiving seat 1 is preferably formed as an annular ring portion. The receiving seat 1 is preferably connected to a housing of the machine 20 by dedicated support means 24.

Figure 2A:
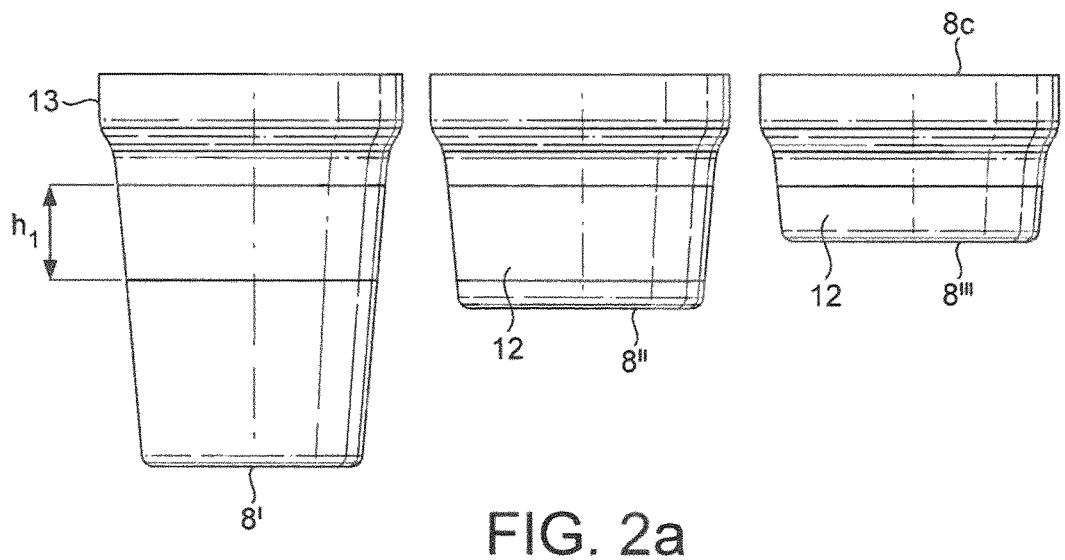
FIGS. 2a and 2b show different shapes of a container body according to the present invention.
Figure 2B:
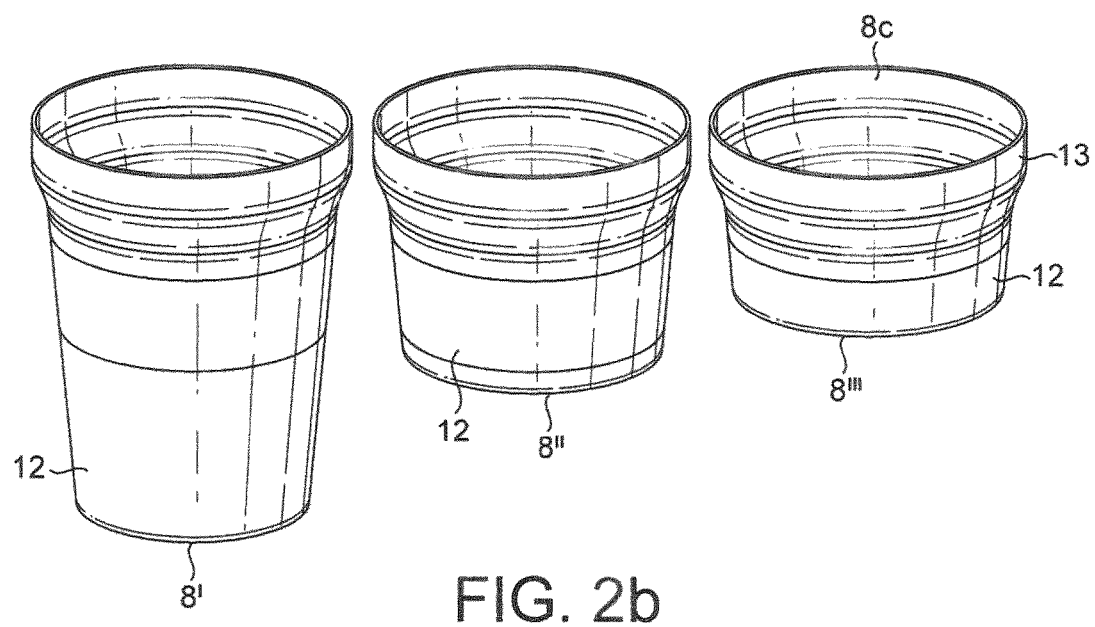

According to such an embodiment, containers 8 of different sizes respectively volumes such as e.g. depicted in FIGS. 2a, 2b may be received in the receiving seat 1.

The machine 20 further comprises a cooling unit 4 connected to a heat exchange element 1a that is preferably connected to or integrally formed with the receiving seat 1 of the machine 20. The heat exchange element 1a is preferably an evaporator fluidically connected to the cooling unit 4 of the machine. The heat exchange element 1a preferably serves as a heat exchanger that withdraws the heat energy from the container 8 and its enclosed food product to lower rapidly the temperature of the product contained in the container.

The heat exchange element 1a preferably comprises an inner geometrical shape complementary to a side wall 8d of the container 8. Thereby, an inner heat exchange contact surface 21 of the heat exchange element 1a is preferably shaped to be adjacent to an outer surface of a side wall 8d of the container 8 when the container is placed in the receiving seat 1.

The heat exchange element 1a is further of a material which provides excellent heat transfer properties, preferably metal such as stainless steel, copper or aluminium. Accordingly, the heat transfer between the container 8 and the heat exchange element 1a is significantly enhanced.

As shown in FIG. 1, the container receiving seat 1 is preferably only partially composed of the heat exchange element 1a. The rest of the receiving seat 1 such as a thermally insulating portion 1b is preferably formed of a material with a lower thermal heat capacity such as e.g. a thermally insulating polymer. For example, the heat exchange element can be a ring which is partially embedded in an outer insulating plastic frame.

The cooling unit 4 of the machine 20 is adapted to cool the heat exchange element 1a. The cooling unit is chosen so that the cooling power of the heat exchange element can be varied, e.g., progressively or stepwise, e.g., at different values ranging from 0% to 100%. Since the heat exchange element 1a comprises excellent heat conductivity the outer wall 8d of the container 8 is cooled down rapidly. The cooling unit 4 can comprise any refrigeration and/or circulatory heat transfer system to cool the heat exchange element 1a, the outer wall 8d of the container 8 and consequently cool the confectionery product 8b within the container 8 as rapidly as possible.

In general, the cooling unit comprises a cooling circuit using a refrigeration gas (e.g., R404A) with a compressor, an evaporator and an expansion valve positioned between the compressor and the evaporator. Therefore, it is possible to control the cooling power of the heat exchange element by adjusting the pump's speed of the compressor which transports the gas and the opening of the expansion valve in the cooling unit.

Optionally, the machine 20 further comprises a liquid tank 2 for holding liquid such as e.g. water and a dedicated pump. The liquid tank 2 may be connected to liquid dispensing means 2a for providing liquid to the container 8 when being placed within the receiving means 1a of the machine 20. The liquid tank may be necessary when the initial product is powder, gel or liquid concentrate and so requires dilution according to a predetermined dilution ratio for achieving the final product with the correct texture.

Furthermore, the machine 20 may comprise one or more topping reservoirs 3 and an associated valve or pump (not shown) for providing toppings in solid or liquid form to the product 8b. The toppings may be liquid coulis, liquid chocolate, honey, caramel or solid products like crisps, flakes, chocolate bits. Additionally, the toppings may be liquefied by means of an additionally provided heating source such as e.g. melted chocolate.

The machine 20 further comprises a stirring unit 5 adapted to connect to stirring member 9 and driving it in a combined movement (as will described in detail later on). For this reason, the stirring unit 5 is preferably equipped with connection means 5a designed for selectively connecting to the stirring member 9. The stirring member 9 may either be part of the machine 20 or be provided as part of the container 8 (integral or part to it). The stirring member is preferably a spoon.

The machine 20 further comprises a control unit 6 for controlling the operations of the components of the machine. The control unit 6 is preferably designed to control a movement of the stirring unit 5, in particular, the rotational velocities and timing. The control unit also preferably controls the heat output of the heat exchange element 1a during the preparation of the food product, and in particular, by varying the cooling power of the heat exchange element.

The machine 20 further comprises recognition means 11 that are preferably arranged to be rotated about the rotational axis Z of the receiving means 1 respectively about the rotational axis X of the container 8 when being placed in the receiving means 1.

Figure 10:
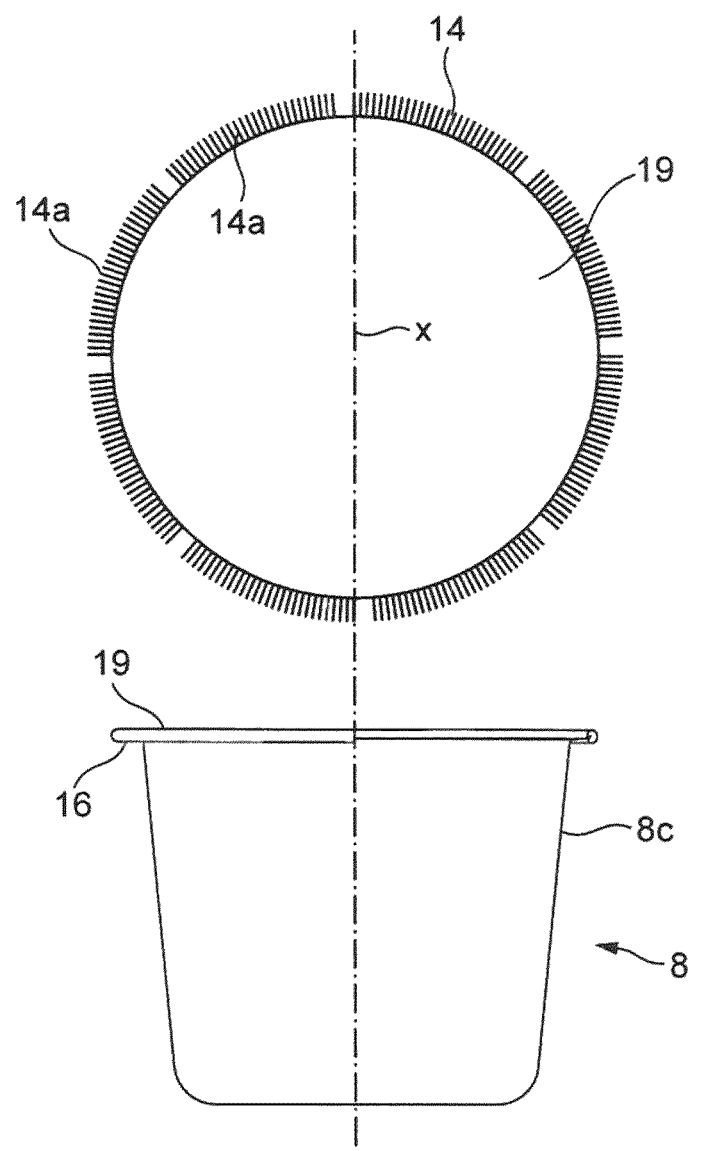
FIG. 10 shows a schematic drawing of a preferred embodiment of the container of the system with identification means.

The recognition means 11 are preferably connected to the driving means 5. As in depicted in FIG. 4, the recognition means 11 may be connected to the rotating member 5a of the driving means 5. The recognition means 11 are preferably arranged offset with respect to the rotational axis Z of the receiving means. Hence, rotation of the rotating member 5a of the stirring unit 5 about the rotational axis Z leads to a rotation of the recognition means 11 about the rotational axis Z. Accordingly, identification means 14 (see FIG. 10) such as e.g. a barcode arranged circularly at a surface of the container 8 may be recognized and read by the recognition means 11. The identification means 14 preferably comprise a plurality of barcode portions 14a carrying identical information and being arranged about the rotational axis X of the container 8.

The control unit 6 is preferably connected to the recognition means 11 in order to control the operation of the stirring unit 5 and/or of the heat exchange element 1a in response to the information read from the particular container 8 by the recognition means 11.

As shown in FIGS. 2a and 2b, different containers 8', 8", 8''' may be provided each of which enclose a different volume such as 300 ml, 200 ml or 150 ml respectively. Dependent on the product to be prepared by the respective container 8, the size and volume of the container 8 is adapted to contain a predefined amount of initial product ingredients necessary for preparing the specific product.

As already mentioned, a lid member (not shown) is preferably provided to each of the containers in order to close off aperture 8c of the container and thus, to enclose the ingredients 8b therein.

The containers preferably comprise shelf-stable comestible ingredients. In addition, the container preferably comprises a free head space closed by the lid and which may contain a protective gas such nitrogen and the like.

As shown in FIG. 2a, 2b, the containers 8',8",8'" may all comprise an essentially trunconical shape. Alternatively, the container may as well have an essentially transversally curved shape.

In a preferred embodiment, the container 8 comprises a heat transfer portion 12 which is preferably integrally formed with the body 8a of the container. The heat transfer portion 12 is preferably an annular portion of constant height h1. The heat transfer portion of the container may be integrally formed with a sidewall of the container.

As shown in FIGS. 2a, 2b, the containers 8',8",8'" all comprise an essentially common heat transfer portion 12. The heat transfer portion 12 is preferably arranged such as to overlap with the heat exchange contact surface 21 of the machine 20 when the respective container 8',8",8'" is arranged in the seat 1 of the machine.

The containers 8',8",8'" may also comprise an upper rim portion 13 which is of essentially identical geometric shape. The upper rim portion 13 may be a portion of increased diameter of the container body 8 as indicated in FIGS. 2a and 2b. Alternatively or in addition, the upper rim portion 13 may as well comprise a flange-like rim portion (not shown) and/or a curled outer rim portion extending from the flange-like rim portion onto which can be sealed a closing lid of the container.

Figure 3:
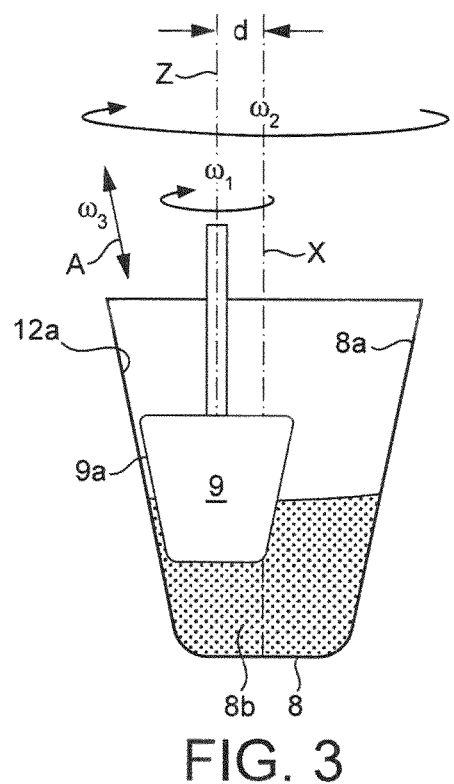
FIG. 3 shows a schematic drawing relating to the plurality of movements of the stirring member in a preferred embodiment of the system.

FIG. 3 shows a container 8 to which the stirring member 9 is provided. The stirring member 9 is removably connectable to the stirring unit 5 of the machine 20. Thereby, removable connection means 5a such as e.g. magnets and/or clips may be used for connecting the stirring member 9 to the stirring unit 5 of the machine 20.

The stirring member 9 is preferably a spoon-shaped member which comprises at least one outer preferably circumferential surface 9a that is complementary formed to an inner freezing surface 12a of the container 8.

The stirring unit 5 of the preparation machine 20 is designed for providing a combination of movements of the stirring member 9 in order to ensure effective mixing and cooling of the product.

Figure 6:
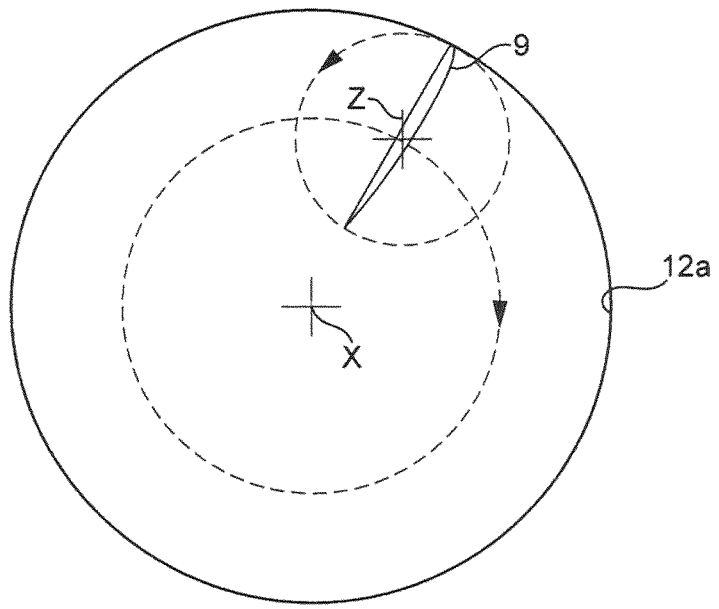
FIG. 6 illustrates, in cross section along line A of FIG. 3, the epicyclical combination of movement of the stirring member in the container according to a preferred mode of the invention.

In the first mode shown in FIGS. 3 and 6, the stirring unit 5 is designed for rotating the stirring means 9 about a longitudinal axis Z of the stirring means 9. The longitudinal axis Z is preferably arranged offset to a central longitudinal axis X of the container. Preferably, the longitudinal axis Z is arranged in parallel at a constant distance d from the centre axis X of the container. If necessary, the distance d may be adjustable between the outer surface 9a of the stirring member 9 and the inner freezing surface 12a of the container 8.

The stirring unit 5 is further designed to enable a closed loop motion about the central axis X. The closed loop motion can be an orbital rotation of the stirring member 9 about the central axis X of the container 8. However, it should be kept in mind that non-rotational but elliptical, triangular, or square or polygonal-path motions can be envisaged as well. The centre axis X of the container preferably coincides with a centre axis of the receiving seat 1 of the machine 20 when the container is accommodated therein.

The stirring unit 5 is preferably adapted to additionally provide a translatory motion of the stirring member 9 parallel to an inner freezing surface 12a of the container 8 as indicated by arrow A. Thereby, the outer surface 9a of the stirring member 9 is preferably moved in parallel to the inner freezing surface 12a of the container 8. Thereby scraping of a larger surface can be successfully obtained, in particular, allowing the scrape the product as it increases in size during aeration.

The stirring unit 5 is preferably further adapted to control the rotational speeds $\omega_1$, $\omega_2$ of the stirring member about the respective axes Z, X. These speeds can be controlled to remain constant during the full product preparation cycle or to vary stepwise or progressively. Further, the stirring unit 5 may be designed to control and adapt a speed $\omega 3$ of the stirring member 9 in direction A.

Due to the different movements of the stirring member 9, which direction and/or speed may be selectively adapted by the stirring unit 5, as a function of the type of cooled product, e.g., confectionery or drink, to produce, an effective heat transfer and mixing of the product 8b within the container 8 may be obtained.

The different movements about axes X, Z and in translator direction A may either be individually provided such as within a given sequence, or as a combined movement of the stirring member 9 within the container.

The stirring member 9 is preferably positioned at the inner freezing surface 12a of the container 8 at the heat exchange portion 12 or opposite to the heat exchange element 1a when the container 8 is placed in the machine 20 (see FIG. 1). Accordingly, the product to be cooled may be scraped between a surface 9a of the stirring member 9 and the inner cooling surface 12a which is cooled by the cooling means 1a of the machine.

Figure 4:
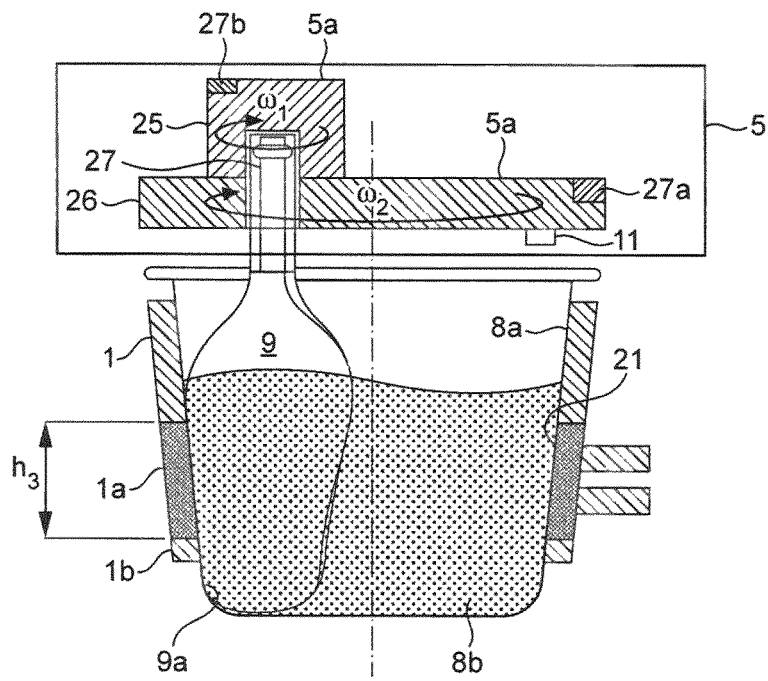
FIG. 4 shows an enlarged drawing of the stirring unit of the system connected to the stirring member within the container.

FIG. 4 shows an enlarged drawing of the stirring unit 5 of the system connected to the stirring member 9 within the container 8.

The connection means 5a for connecting the stirring member 9 to the stirring unit 5 preferably comprises a first driving member 25 which enables a rotation of the stirring member 9 about its longitudinal axis Z. The driving member 25 is preferably designed for selectively connecting to a distal portion of a support shaft 27 of the stirring member 9.

The connection means 5a preferably further comprises a second driving member 26. The second driving member 26 engages the support shaft 27 of the stirring member 9 to drive the shaft 27 in orbital rotation about the central axis X.

The first and second driving members 25, 26 are preferably connected to the control unit 6 of the device, which individually controls the direction and the rotational velocities of the first and second driving member 25, 26.

The first and second driving member 25, 26 preferably each comprise a torque sensor 27a, 27b connected to the control unit 6 of the machine. Accordingly, the control unit 6 may control and adjust the rotational velocity of the driving members 25, 26 and thus of the stirring member 9 in response to the torque detected by the respective sensors 27a, 27b. As a result, the velocity can be varied (e.g., reduced, increased or stopped) during the preparation to adapt the product configurations (e.g., ice cream, whipped cream dessert, etc.).

FIGS. 5a to 5d relate to schematic drawings of a preferred embodiment of the system, wherein the scraping area S and the cooling area C of the system are indicated.

Figure 5A:
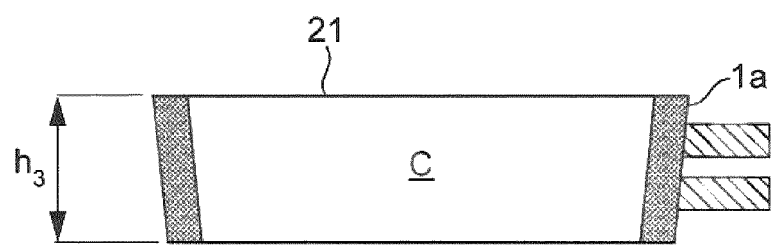
FIGS. 5a to 5d show schematic drawings of a preferred embodiment of the system, wherein the scraping area and the cooling area of the system are indicated.
Figure 5B:
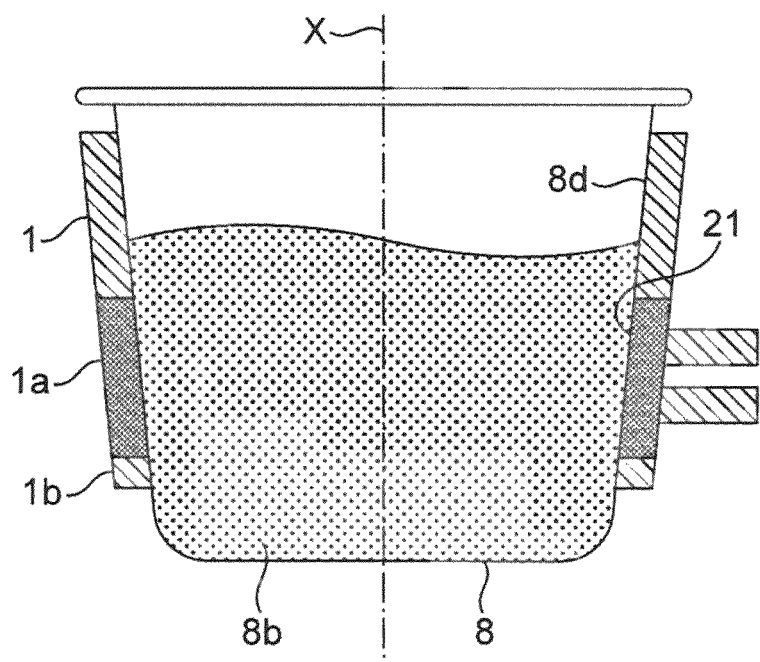

FIG. 5a shows a detailed embodiment of the annular heat exchange element 1a having a height h3 and which defines a heat exchange respectively cooling area C within the contours of the annular element. In case the container 8 is accommodated in the receiving seat 1 of the machine 20 as indicated in FIG. 5b, cooling of the outer wall 8d of the container primarily takes place at a portion of the container wall which overlaps with the contours of the annular heat exchange element 1a. Thereby, a portion of the container wall 8d may comprise a heat exchange portion 12 as indicated in FIGS. 2a and 2b.

Figure 5C:
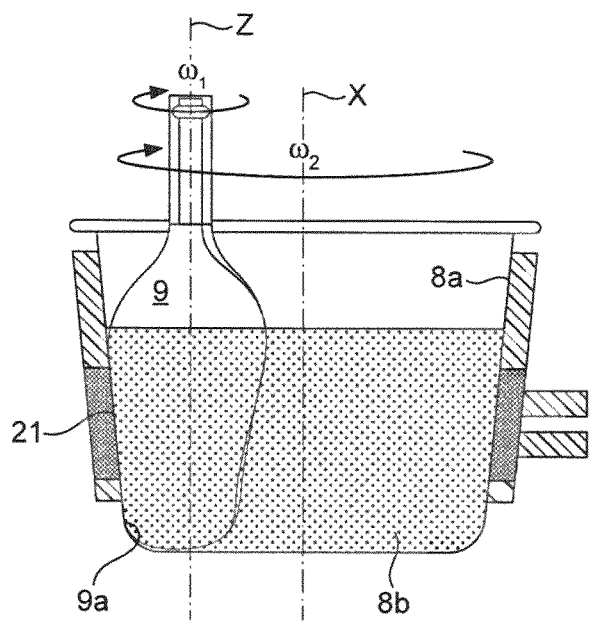
Figure 5D:
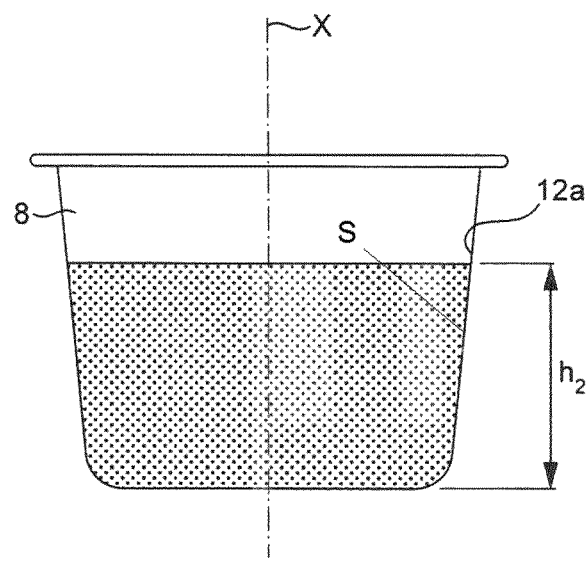

FIGS. 5c and 5d show a vertically extending scraping area S of the container 8 which refers to an area arranged between the inner freezing surface 12a of the container 8 and the outer annular scraping surface 9a of the stirring member 9. The scraping area preferably extends vertically to a height h2 along the inner freezing surface 12a of the container.

As indicated in FIG. 5c, the stirring member 9 is preferably arranged within the container 8 such that the scraping area S defined between the scraping surface 9a of the stirrer and the inner freezing surface 12a of the container is at least coincident with the cooling area C of the heat exchange element 1a of the machine 20.

In particular, the height h2 of the scraping area S is preferably equal to or larger than the height h3 of the cooling area C respectively the heat exchange element 1a. Thereby, the vertically extending scraping area S preferably fully overlaps with the vertically extending cooling area C when seen in side view.

According to such an arrangement, any crust of frozen, sticking or burnt product may be removed from the inner freezing surface 12a by means of the stirring member 9 during preparation of the food product.

Figure 7:
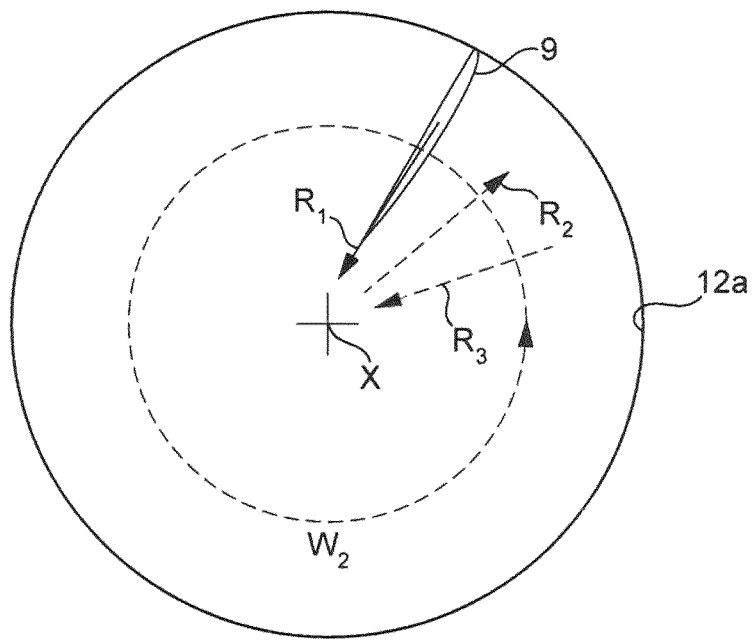
FIG. 7 illustrates, in cross section along line A of FIG. 3, the displacement of the stirring member combining a radial reciprocal movement of the stirring member and an orbital rotation of the stirring member about the central axis of the container according to a possible alternative mode.

FIG. 7 illustrates a variant in which the stirring member is moved in combined fashion, reciprocally and radially while being rotated around the central axis X of the container or seat. In a first movement, the stirring member, such as spoon 9, is arranged to be driven by the driving unit in reciprocal radial directions R1, R2, R3, . . . . While such movement is maintained at regular time intervals, a second orbital movement of controlled velocity ($\omega_2$) of the stirring member is provided to the stirring member. As a result, the inner surface 12a of the container is intermittently scraped by the stirring member, in particular, when its edge is adjacent to the surface. When the stirring member is distant from the surface 12a, the stirring member swirls the product located in the centre of the container. This combined movement forces the product to circulate from the centre to the periphery and vice versa, thereby making sure that no product is left unstirred. This circulation combined to the cooling of the surface of the container ensures a more rapid cooling of the product as well as the achievement of the desired texture.

Figure 8:
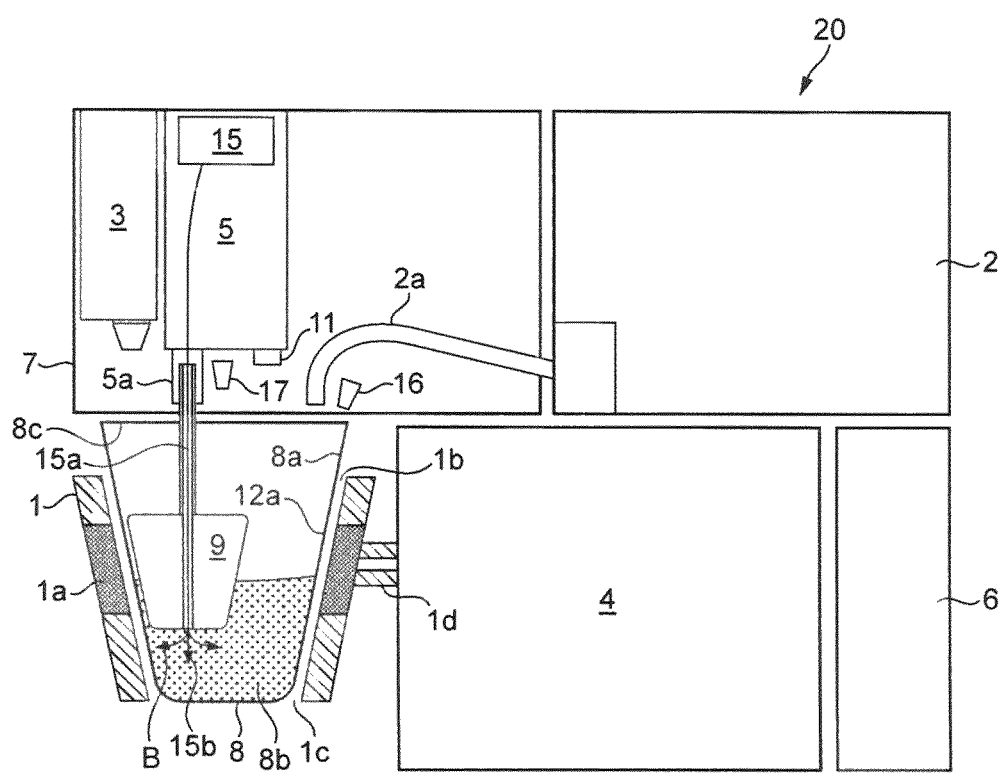
FIG. 8 shows a schematic drawing of another preferred embodiment of the system according to the invention wherein the stirrer is equipped with air transmission means and a product volume sensor.

FIG. 8 relates to another embodiment of the device 20 and the container 8 placed therein. As in the mode of FIG. 1, the device 20 further comprises temperature sensing means 16. Thereby, the sensing means may comprise for example a thermocouple, thermistor or resistance temperature detector which is provided at the receiving means 1. Alternatively or in addition, the temperature sensing means may comprise an infrared temperature sensor designed to directly obtain the temperature of the product 8b within the container 8. The temperature sensing means 16 are connected to the control unit 6 in order to control the cooling unit 4 of the device 20 dependent on the actual temperature of the product 8b within the container 8.

As shown in FIG. 1 or 8, the device 20 may further comprise air transmission means 15 which are designed for injection of air into the container 8.

Preferably, the air transmission means 15 comprise an air pump connected to the stirring means 5, 9 such that air can be injected through the stirring means 9 into the product 8b (see arrows B). Thereby, the stirring means 9 may comprise an internal air channel 15a and a lower outlet opening 15b for guiding the injected air into a lower bottom portion of the container 8. The lower outlet opening 15b is preferably provided in the centre portion of the stirring means 9. Alternatively the outlet opening 15b may as well be arranged at the side surface of the stirring means 9. Thereby, also a plurality of outlet openings may be provided at the side and/or lower surfaces of the stirring means 9. According to such an embodiment, improved aeration of the product to be prepared may be obtained.

Furthermore, the machine preferably comprises a product volume sensor 17 to be able to determine the increase of volume due to the overrun of the product during preparation. The product volume sensor may be an ultrasonic sensor or any other suitable sensing means. The ultrasonic sensor is able to detect the variation of distance between the sensor and the surface of the product during preparation. For example, the air transmission means and/or stirring means can be stopped when the product volume has reached a given threshold.

Figure 9:
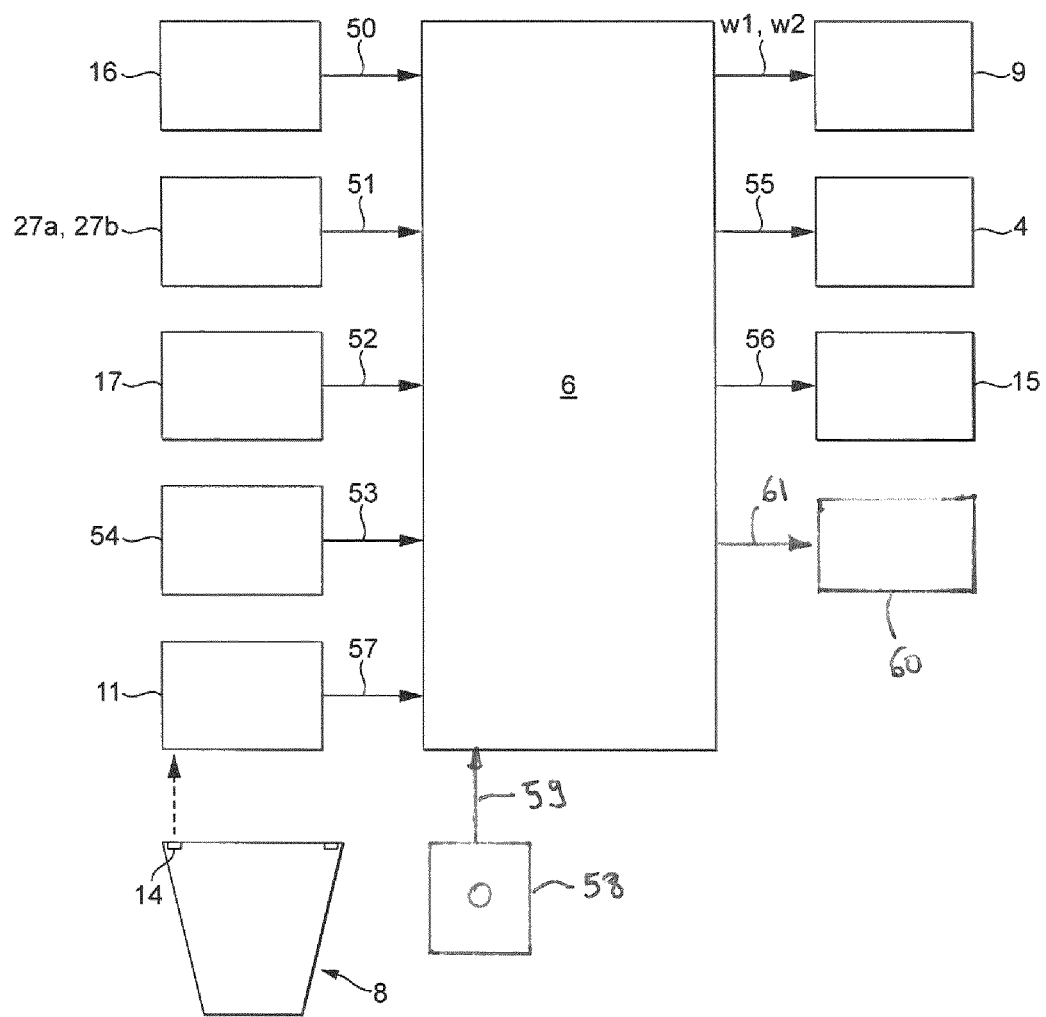
FIG. 9 illustrates schematically the control of machine according to the preferred input and output parameters to be able to prepare a wide range of cooled product.

FIG. 9 illustrates the principle of controlling the preparation of the cooled products according to the invention. For this, input parameters are communicated to the control unit 6 and output parameters are communicated from the control unit to the different actuating means of the machine.

The input parameters can be formed by any one or a combination of two or more of the following parameters:
  the product temperature 50 as sensed by the temperature sensing means 16;
  the torque 51 as sensed by the torque sensor(s) 27a, 27b,
  the product volume increase (i.e., overrun) 52 as sensed by the product volume sensor, e.g., ultrasonic sensor 17,
  the stirring time(s) 53 as determined by a clock 54 (e.g., which may be part of the control unit itself).

The output parameters can be formed by any one or a combination of two or more of the following parameters:
  the velocity ($\omega 1$) of the first rotational movement and/or the second velocity ($\omega 2$) of the second rotational movement of the stirring member (9),
  the cooling power 55 of the heat exchange element (1a),
  the actuation time 56 of the air transmission means 15.

Additionally, the output parameters for controlling the stirring member, power unit and optionally the air transmission means may be controlled according to distinct phases during the preparation of the cooled product. The passage from one phase to the next can be triggered by any one or a combination of the preparation parameters.

Furthermore, the preparation parameters for each phase (e.g., recipe number, output parameters, threshold values, etc.) are function of the type of product to be prepared. For example, the definition can be associated to a recipe code such as a recipe number, a recipe table and the like. Advantageously, the identification means 14 of the container contains data related to the recipe code 57 which is communicated to the control unit via the recognition means 11. For example, the identification means may contain a simple recipe number or, alternatively, part or all of the preparation parameters, i.e., a combination of thresholds values for the input parameters and/or output parameters related to the recipe. In case of a simple recipe number, the control unit comprises a memory containing a table for making the correspondence between the recipe code and the preparation parameters.

The machine may further comprise a user interface 58 for providing a start input signal 59 to the control unit so as to start control of preparation of the cooled product, in particular, for actuation and/or control of the at least stirring unit and cooling unit. Therefore, the start signal triggers the start of the product recipe that may start by recognizing the identification means of the container and automatically starting the control of the stirring unit and cooling unit of the machine and the acquisition of the various input parameters.

The machine may further comprise a display device 60 capable of displaying a visual and/or acoustic signal arranged for receiving a stop output signal 61 from the control unit indicating the end of the preparation of the cooled product. The stop output signal is preferably coupled to an interruption signal sent by the control unit to the stirring unit to stop the rotational movements of the stirring member. It can optionally be coupled to an interruption or pause signal sent from the control unit to the cooling unit to stop the cooling unit or reduce the cooling power of the heat exchange element, with or without delay (a delay may indeed be useful to prevent the product to warm too rapidly before the user removes the container from the seat). The stop output signal received by the display device may be generated by the control unit as a response to meeting certain product and/or process conditions in the last phase of the product preparation such as when the viscosity of the product has reached a predetermined threshold (i.e., until a predetermined torque is detected by the torque sensor) and the sensed product temperature has reached a predetermined threshold value. In an alternative or in addition, the conditions for generating the stop output signal may be met when a given time limit is reached.

The present invention enables the preparation of a frozen confectionary, which can be freshly prepared in single portions within the initial container that serves at the same time as process and enjoy container.

Example 1

In the following, the basic working principle of the machine for preparation of food product will be explained with respect to a recipe for vanilla ice cream and using the control principle aforementioned.

First, the mobile structure 7 of the machine 20 (see FIG. 1) is brought into its open position in which a container 8 from which a lid member provided to close a central opening 8c of the container 8 has been removed is inserted in the receiving seat 1. In the open position, the stirring means 9 may be manually connected to stirring unit 5 of the machine. The mobile structure 7 is then brought into its closed position in which the stirring unit 5 and the topping tank 3 are lowered towards the container 8. In this position, the stirring means 9 are brought into a position adjacent to and contacting the inner freezing surface 12a of the container 8.

In a first fast foaming phase, cooling of the food product within the container is obtained via the control unit 6 setting the cooling power of the heat exchange element to 100%. The stirring member 9 is rotated within the container by means of the driving means 25 about axis Z at $\omega_1$=800 rpm. Further, the second driving means 26 is controlled to rotate the stirring member 9 at the same time but lower speed, about axis X at $\omega_2$=−60 rpm.

Accordingly, the product is simultaneously cooled, stirred and scraped within the container 8. This movement is continued for maximum 120 seconds or until a predefined threshold value for a torque at the stirring member 9 is detected by torque sensor 27b at the first driving means 25.

In a second preparation phase, the rotational speed is lowered to avoid overflow of the product 8b within the container 8. Thereby, $\omega_1$ is set to 400 rpm and $\omega_2$ is held at −60 rpm. The cooling power of cooling means 1a is kept at 100% of its maximal cooling power.

This setting is applied for maximum 120 seconds or until a predefined torque value is detected by torque sensor 27b, while at the same time the final temperature is about −10° C., detected by a dedicated temperature sensor of the machine.

The mobile structure 7 of the machine 20 is then brought into its open position such that the container 8 may be removed from the receiving means 1. Thereby, the stirring unit 5 may disconnect from the stirring means 9. A user may then retrieve the container 8 from the receiving means 1 of the machine.

Example 2

This example refers to a preparation for a whipped yoghurt using the control principle aforementioned, for which, in a first preparation phase, a relatively higher velocity of the stirring member 9 is provided.

In particular, rotational velocity $\omega_1$ is set to 1200 rpm, while rotational velocity $\omega_2$ is set to −30 rpm. The cooling power of the heat exchange element 1a is set to 100%. This setting is applied for maximum 120 seconds or until temperature of the product is detected to be about +4° C.

In a second preparation phase, the rotational velocities $\omega_1$, $\omega_2$ are kept constant (compared to the first phase) and the cooling power is reduced to 30%. This setting is applied for maximum 120 seconds or until a predefined torque value is detected by torque sensor 27b.

Example 3

This example 3 refers to the preparation of a milk smoothie, and using the control principle aforementioned, for which in a first preparation phase a relatively slow stirring of the stirring means 9 is applied in order to avoid splashes of the originally liquid product. Thereby, $\omega_1$ is set to 400 rpm, while rotational velocity $\omega_2$ is set to −30 rpm. The cooling power of the heat exchange element is set to 100%. This setting is applied for maximum 120 seconds or until the temperature of the product is below 6° C.

In a second preparation phase, $\omega_1$ is set to 800 rpm, while rotational velocity $\omega_2$ is set to −60 rpm. The cooling power is kept at 100%. Accordingly, a relatively fast foaming and cooling of the product is applied. This setting is applied for a maximum of 120 seconds or until the temperature is about +2° C.

In a third preparation phase, $\omega_1$ and $\omega_2$ are kept constant (compared to the second phase), while cooling power of the cooling unit is reduced to 30%. This setting is applied for a maximum of 120 seconds or until a predefined torque value is detected by torque sensor 27b.

During the preparation process of the above-outlined examples, liquid or solid toppings may be added from the topping tank 3 to the main product within the container 8. This may take place close to the end of the preparation process such that liquid toppings will create an appealing visual swirl for the consumer and solid toppings will remain crispy.

The present invention enables the effective preparation of a cold food product such as a aerated frozen or chilled confectionery, which can be freshly prepared in single portions within the initial container that serves at the same time as process and enjoy container.

With the present invention it is further possible to prepare several different types of such products in a short time. Since the container is dispensable and does not need to be cleaned, the handling is simplified and the need for cleaning is reduced.

Although the present invention has been described with reference to preferred embodiments thereof, many modifications and alternations may be made by a person having ordinary skill in the art without departing from the scope of this invention which is defined by the appended claims.

The invention claimed is:

1. A system comprising a container, the system further comprising a food product preparation machine comprising:
   a receiving seat configured for accommodating the container, the receiving seat comprising a heat exchange element having a heat exchange contact surface arranged to be in contact with an outer surface of a side wall of the container when the container is placed in the machine;
   a cooling unit arranged for cooling the heat exchange element;
   a stirring unit connectable to a stirring member and arranged for driving the stirring member in at least one rotational movement;
   a member configured for measuring a temperature of a cooled food product while being prepared;
   a torque sensing member configured for sensing the viscosity of the cooled food product during preparation;
   a control unit configured for controlling output parameters according to phases during the preparation of the cooled food product, a passage from a first phase to a second phase being triggered by any one or a combination of preparation parameters, which are specific to a type of cooled food product to be prepared, the output parameters comprise: at least one rotational velocity of the stirring member and a cooling power of the cooling unit,
   wherein the preparation parameters comprise the measured temperature of the cooled food product, a stirring time and a sensed torque value, and the container comprising ingredients for the preparation of the cooled food product, the container comprising a heat transfer side wall portion having an inner freezing surface, the container comprises an identification member containing a recipe code related to the type of cooled food product to be prepared; and
   a recognition member connected to the control unit and the stirring unit and configured for interacting with the identification member; and wherein the control unit is further configured to control the preparation of the cooled food product according to the type of cooled food product identified by the recognition member.

2. The system according to claim 1, wherein the identification member comprises a barcode.

3. The system according to claim 1, further comprising a product volume sensor configured for determining an increase of volume due to an overrun of the cooled food product during preparation, the preparation parameters further comprising a product volume increase sensed by the product volume sensor.

4. The system according to claim 1, further comprising an air transmission member configured for providing air into the cooled food product, and wherein the output parameters further comprise an actuation time for the air transmission member.

5. The system according to claim 1, further comprising a user interface configured for providing a start input signal to the control unit, the start input signal configured to start control of preparation of the cooled food product.

6. The system according to claim 1, further comprising a display device configured for displaying a visual and/or an acoustic signal and arranged for receiving a stop output signal from the control unit indicating an end of the preparation of the cooled food product.

7. A system comprising a container, the system further comprising a food product preparation machine comprising:
   a receiving seat configured for accommodating the container, the receiving seat comprising a heat exchange element having a heat exchange contact surface arranged to be in contact with an outer surface of a side wall of the container when the container is placed in the machine;
   a cooling unit arranged for cooling the heat exchange element;
   a stirring unit connectable to a stirring member and arranged for driving the stirring member in at least one rotational movement;
   a member configured for measuring a temperature of a cooled food product while being prepared;
   a torque sensing member configured for sensing the viscosity of the cooled food product during preparation;
   a control unit configured for controlling output parameters according to phases during the preparation of the cooled food product, a passage from a first phase to a second phase being triggered by any one or a combination of preparation parameters, which are specific to a type of cooled food product to be prepared, the output parameters comprise: at least one rotational velocity of the stirring member and a cooling power of the cooling unit, and
   wherein the preparation parameters comprise the measured temperature of the cooled food product, a stirring time and a sensed torque value, and the container comprising ingredients for the preparation of the cooled food product, the container comprising a heat transfer side wall portion having an inner freezing surface,
   wherein the stirring unit is arranged for driving the stirring member according to a combination of movements, wherein the combination of movements comprises a first rotational movement of the stirring member about a longitudinal axis of the stirring member, the longitudinal axis of the stirring member is arranged offset to a central longitudinal axis of the container or the receiving seat, and a second closed loop movement about the central longitudinal axis of the container or the receiving seat, and wherein the output parameters comprise a first velocity of the first rotational movement and a second velocity of the second closed loop movement of the stirring member.

8. The system according to claim 7, wherein the container comprises an identification member containing a recipe code related to the type of cooled food product to be prepared.

9. The system according to claim 8, further comprising a recognition member connected to the control unit and configured for interacting with the identification member; and wherein the control unit is further configured to control the preparation of the cooled food product according to the type of cooled food product identified by the recognition member.

10. The system according to claim 9, wherein the recognition member is connected to the stirring unit.

11. The system according to claim 7, wherein the closed loop movement is an orbital rotation of the stirring member about the central longitudinal axis of the container.

* * * * *